United States Patent [19]

Boehlke et al.

[11] 4,105,624

[45] Aug. 8, 1978

[54] REINFORCED VINYL CHLORIDE POLYMER COMPOSITIONS CONTAINING POLY-NEOPENTYLENE TEREPHTHALATE

[75] Inventors: Klaus Boehlke, Hessheim; Martin Welz, Bad Duerkheim; Peter Föerster, Ludwigshafen; Hans-Josef Sterzel, Dannstadt-Schauernheim; Rolf Wurmb, Heidelberg; Hans Géorg Matthies, Ludwigshafen, all of Fed. Rep. of Germany

[73] Assignee: BASF Aktiengesellschaft, Ludwigshafen am Rhein, Fed. Rep. of Germany

[21] Appl. No.: 792,820

[22] Filed: May 2, 1977

[30] Foreign Application Priority Data

May 15, 1976 [DE] Fed. Rep. of Germany ....... 2621724

[51] Int. Cl.$^2$ ............................ C08K 7/14; C08K 7/20
[52] U.S. Cl. ............................... 260/40 R; 260/42.18; 260/42.49; 260/873
[58] Field of Search .................. 260/873, 42.18, 42.49, 260/40 R

[56] References Cited

U.S. PATENT DOCUMENTS

| | | | |
|---|---|---|---|
| 3,546,158 | 12/1970 | Champion et al. | 260/42.49 X |
| 3,574,789 | 4/1971 | Bungs et al. | 260/873 |
| 3,644,271 | 2/1972 | Tulley | 260/42.18 |
| 3,686,361 | 8/1972 | De Witt et al. | 260/873 |

*Primary Examiner*—Sandra M. Person
*Attorney, Agent, or Firm*—Keil, Thompson & Shurtleff

[57] ABSTRACT

Thermoplastic compositions based on mixtures of a vinyl chloride polymer and conventional reinforcing agents.

The compositions contain a linear polyester, which is solid at room temperature and is compatible with the vinyl chloride polymer, as a processing assistant.

The thermoplastic compositions may in particular be used for the manufacture of injection moldings.

6 Claims, No Drawings

REINFORCED VINYL CHLORIDE POLYMER COMPOSITIONS CONTAINING POLY-NEOPENTYLENE TEREPHTHALATE

The present invention relates to thermoplastic compositions based on vinyl chloride polymers which contain linear polyesters in addition to conventional reinforcing agents.

In the manufacture of injection moldings from fiber-reinforced thermoplastics, lubricants or slip agents are added to the plastics to achieve good flow of the polymer melt during processing. The lubricant may also serve as a mold release agent, so as to achieve short cycle times. In addition, good lubricants result in moldings of reinforced thermoplastics having a smooth surface.

The lubricants conventionally used for processing reinforced thermoplastic by injection molding are metal salts, esters or amides of fatty acids. It is true that these additives improve the melt flow, the ease of mold release and, in many cases, also the surface quality of the moldings, but as a rule they worsen the mechanical properties, such as tensile strength and impact strength, since they detract from the adhesion between the reinforcing agent and the plastic matrix.

In the processing of fiber-reinforced polyvinyl chloride, to produce injection molding compositions and sheeting, as described, for example, in German Laid-Open Application DOS 2,312,816, achieving adequate flow of the material, required to give products having good properties, again presents a problem; this cannot be solved by means of the lubricants and processing assistants conventionally used for injection molding of reinforced thermoplastics and polyvinyl chloride.

It is an object of the present invention to provide processing assistants for reinforced vinyl chloride polymers, especially for injection molding, which improve the flow of the polymer melt, the ease of mold release and the surface quality of the moldings, without adversely affecting the level of mechanical properties of the reinforced vinyl chloride polymers, and which in particular give products of high rigidity.

We have found that this object is achieved, according to the invention, by adding to the vinyl chloride polymers, in addition to the reinforcing agents, specific high molecular weight linear polyesters which are compatible with the vinyl chloride polymers.

Accordingly, the present invention relates to reinforced vinyl chloride polymer compositions which contain:

(A) from 99 to 50 parts by weight of a homopolymer of vinyl chloride or a copolymer of vinyl chloride with up to 30 percent by weight of other copolymerizable monomers, (B) from 1 to 50 parts by weight of a linear polyester which is solid at room temperature and is compatible with the vinyl chloride polymer, the sum of A and B being 100, (C) from 10 to 50 percent by weight, based on the sum of A and B, of a conventional reinforcing agent and (D) from 0 to 90 percent by weight, based on the sum of A and B, of other fillers.

It is true that the use of polyester as plasticizers and processing assistants for vinyl chloride polymers has already been disclosed and is described, for example, in German Laid-Open Application DOS 2,017,398 and DOS 2,252,104. However, the addition of randomly chosen polyesters to vinyl chloride polymers which do not contain any reinforcing agents gives products which have a low rigidity and low Vicat heat distortion point; even the addition of reinforcing agents cannot offset this deterioration. It was therefore surprising and unforeseeable that, by adding specific linear polyesters, which are solid at room temperature, to reinforced vinyl chloride polymers, molding compositions are obtained which not only have good flow and good processability, especially by extrusion and injection molding, but in addition have mechanical properties of a good level, in particular high rigidity and a high heat distortion point.

Suitable component A of the compositions according to the invention are the conventional vinyl chloride homopolymers and copolymers. The vinyl chloride homopolymers preferably have a K-value, measured by the Fikentscher method (DIN 53,726) of from 55 to 80, particularly preferably from 58 to 70. The vinyl chloride copolymers may contain up to 30 percent by weight, preferably up to 15 percent by weight, based on the vinyl chloride polymer, of other monomers copolymerizable with vinyl chloride, e.g. vinylidene chloride, vinyl esters, acrylic esters, acrylonitrile or olefins. The homopolymers and copolymers of vinyl chloride can be manufactured by any conventional and customary polymerization processes entailing polymerizing the monomers in mass, solution, aqueous suspension or aqueous emulsion. The use of vinyl chloride homopolymers, especially of those which have been manufactured by aqueous suspension polymerization, is preferred. If a suspension polyvinyl chloride is employed, the mean particle size of the polymer is in general less than 300 $\mu$m. The polyvinyl chloride preferably has a Vicat softening point of from 70° to 85° C (measured according to DIN 53,460, method B).

The component B of the compositions according to the invention is a linear polyester which is solid at room temperature, preferably has a melting point of from 100° C to 200° C and is compatible with the vinyl chloride polymer. The polyester employed should have a high molecular weight, preferably a weight-average molecular weight of from 5,000 to 50,000. The polyesters may be obtained either by polycondensation of hydroxycarboxylic acids or, preferably, be synthesized from a dicarboxylic acid and saturated diols. Preferred components B are polyesters of an aromatic dicarboxylic acid, especially terephthalic acid, and saturated aliphatic diols, e.g. ethylene glycol, 1,4-butanediol and especially neopentylglycol.

The polyesters may be manufactured by conventional and customary processes. The esters synthesized from a dicarboxylic acid and a diol are obtained, for example, by esterifying the dicarboxylic acid with a 1.2-molar to 2-molar excess of the diol in question, if necessary under superatmospheric pressure, at from 150° to 220° C. The low molecular weight ester thus obtained is then condensed under reduced pressure, down to 1 mm Hg, at up to 250° C, using conventional condensing catalysts, to give a high molecular weight polyester. In an alternative method, a lower alkyl ester, preferably the dimethyl ester, of the dicarboxylic acid in question is employed, and is reacted with a 1.2-molar to 2-molar excess of the diols in the presence of a trans-esterifying catalyst, e.g. tetrabutyl orthotitanate. The polycondensation of the trans-esterification product is then again carried out under reduced pressure, down to 1 mm Hg, at up to 250° C, in the presence of the conventional condensing catalysts.

The compositions according to the invention contain from 99 to 50 parts by weight, preferably from 90 to 70 parts by weight, of the vinyl chloride polymer (component A) and from 1 to 50 parts by weight, preferably from 10 to 30 parts by weight of the polyester (component B), with the proviso that the sum of the components A + B is 100.

In the main, glass fibers are used as the reinforcing agent (component C). However, glass beads, carbon fibers and mineral reinforcing agents, e.g. talc, asbestos or gypsum fibers, may also be used. The use of low-alkali E-glass fibers is preferred. The glass fibers in general have a diameter of from 5 to 20 $\mu$, preferably from 8 to 10 $\mu$, and a mean length of from 0.05 to 1 mm, preferably from 0.1 to 0.5 mm. They may be finished, in the conventional manner, with conventional sizes and adhesion promoters, e.g. based on organosilanes. The glass fibers are particularly suitable reinforcing agents if the compositions according to the invention are to be injection-molded; for such cases, the fibers may be used as glass fiber rovings or as chopped strands. If the compositions according to the invention are to be processed to give sheeting, the reinforcing agents are preferably employed as textile sheet-like materials, in the form of mats, webs, felts or woven fabrics produced from the fibrous reinforcing agents, especially from glass fibers. The compositions according to the invention contain from 10 to 50 percent by weight, preferably from 20 to 30 percent by weight of the reinforcing agents, based on the sum of the components A and B.

In addition to the reinforcing agents, the compositions according to the invention may contain, as component D, other fillers in amounts of up to 90 percent by weight, based on the sum of the components A and B. Examples of such fillers are metal powders of particle size from 1 to 150 $\mu$, pulverulent carbon, preferably graphite powder, with particle sizes of from 0.1 to 1,000 $\mu$, and mineral fillers, e.g. chalk. The proportion of the fillers in the compositions according to the invention is preferably from 10 to 90 percent by weight, especially from 30 to 50 percent by weight, based on the sum of the components A and B.

The advantages achieved by the invention are that the polyesters, used as processing assistants according to the invention, give reinforced vinyl chloride polymers which have better flow than is achievable with conventional lubricants, and which are easily processable, especially by injection molding. Moldings manufactured from the compositions according to the invention exhibit improved surface quality and have a good level of mechanical properties, in particular high rigidity and a high heat distortion point.

The reinforced molding compositions of the invention may contain conventional additives, e.g. stabilizers, antioxidants, dyes and pigments and, where necessary, also conventional lubricants.

The conventional processes for reinforced thermoplastics may be used to manufacture the molding compositions according to the invention. For example, they can be manufactured in any suitable kneader in which case the vinyl chloride polymer and the polyester are melted and mixed with the reinforcing agent and the other additives. If the reinforcing agents are used as textile sheet-like structures, the compositions according to the invention can also be manufactured by impregnating the said structures with a melt of the vinyl chloride polymer and the polyester. The compositions according to the invention may in particular be used for the manufacture of injection moldings or of sheeting.

In the Examples, parts and percentages are by weight, unless stated otherwise.

The tensile strength and flexural strength of the reinforced vinyl chloride polymer compositions were determined as described in DIN 53,455. The impact strength $a_n$ was measured as described in DIN 53,453; the heat distortion point was determined as described in DIN 53,460, method B.

EXAMPLE 1

70 parts of a polyvinyl chloride manufactured by suspension polymerization and 30 parts of polyneopentyl terephthalate (PNT) were processed with 24.8 parts by weight, based on the sum of polyvinyl chloride and PNT, of short glass fibers. The polyvinyl chloride had a K value of 61 and a Vicat softening point of 83° C. The amorphous PNT, manufactured from terephthalic acid and neopentylglycol, had a K value of 58 and a glass transition temperature of 80° C.

The individual components were mixed in a suitable twinscrew extruder without exceeding 190° C. After extruding strands of the mixture and chopping these, the product is obtained in a granular form. These granules are processed on commercial injection molding machines at up to 230° C. The mechanical properties of the mixture are summarized in the Table below.

EXAMPLE 2

Using the method described in Example 1, 80 parts of polyvinyl chloride and 20 parts of PNT were processed with 23.3 percent by weight, based on the sum of polyvinyl chloride and PNT, of short glass fibers. The mechanical properties of the mixture are shown in the Table.

EXAMPLE 3

A mixture of 70 parts of polyvinyl chloride and 30 parts of PNT was processed together with 2 glass mats of continuous filaments of E-glass, weighing 600 g/m² (glass content: 23.7%, based on the sum of polyvinyl chloride and PNT). A flat sheet was produced; its mechanical properties are shown in the Table.

EXAMPLE 4

Example 1 was repeated but in this case 21.4%, based on the sum of polyvinyl chloride and PNT, of talc of particle size less than 10 $\mu$ were also incorporated into the mixture. The product obtained had the mechanical properties shown in the Table.

TABLE

| Example | Tensile strength (N/mm²) | Flexural strength (N/mm²) | Impact strength $a_n$ (kJ/m²) | Vicat temperature (° C) |
|---|---|---|---|---|
| 1 | 61 | 95 | 12.5 | 73 |
| 2 | 61 | 94 | 12.3 | 72 |
| 3 | 63.2 | 105 | 43 | 78 |
| 4 | 57 | 95 | 10.2 | 76 |

We claim:
1. A reinforced vinyl chloride polymer composition containing
   (A) from 99 to 50 parts by weight of a homopolymer of vinyl chloride or a copolymer of vinyl chloride with up to 30 percent by weight of one or more copolymerizable monomers,

(B) from 1 to 50 parts by weight of a linear terephthalic acid-neopentylglycol polyester which is solid at room temperature and is compatible with the vinyl chloride polymer, with the proviso that the sum of A and B is 100, (C) from 10 to 50 percent by weight, based on the sum of A and B, of a reinforcing agent and (D) from 0 to 90 percent by weight, based on the sum of A and B, of one or more other fillers.

2. A reinforced vinyl chloride polymer composition as claimed in claim 1, wherein the polyester employed as component B has a melting point of 100° to 200° C and a weight-average molecular weight of 5,000 to 50,000.

3. A reinforced vinyl chloride polymer composition as claimed in claim 1, containing from 10 to 30 percent by weight of component B based on the sum of A and B.

4. A reinforced vinyl chloride polymer composition as claimed in claim 1, wherein the reinforcing agent is glass fibres.

5. A reinforced vinyl chloride polymer composition as claimed in claim 1, wherein the reinforcing agent is fibers of glass, carbon, talc, asbestos or gypsum or is glass beads.

6. A reinforced vinyl chloride polymer composition as claimed in claim 1, wherein the reinforcing agent is a mat of continuous glass filaments.

* * * * *